United States Patent
Asaro et al.

(10) Patent No.: US 11,307,993 B2
(45) Date of Patent: Apr. 19, 2022

(54) DYNAMIC REMAPPING OF VIRTUAL ADDRESS RANGES USING REMAP VECTOR

(71) Applicants: ADVANCED MICRO DEVICES, INC., Santa Clara, CA (US); ATI TECHNOLOGIES ULC, Markham (CA)

(72) Inventors: Anthony Asaro, Markham (CA); Richard E. George, Santa Clara, CA (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 458 days.

(21) Appl. No.: 16/200,446

(22) Filed: Nov. 26, 2018

(65) Prior Publication Data

US 2020/0167291 A1 May 28, 2020

(51) Int. Cl.
*G06F 11/07* (2006.01)
*G06F 11/36* (2006.01)
*G06F 9/30* (2018.01)
*G06F 12/1009* (2016.01)

(52) U.S. Cl.
CPC ...... *G06F 12/1009* (2013.01); *G06F 9/30101* (2013.01); *G06F 11/0721* (2013.01); *G06F 11/0751* (2013.01); *G06F 11/0772* (2013.01); *G06F 11/0778* (2013.01); *G06F 11/362* (2013.01); *G06F 2212/1044* (2013.01); *G06F 2212/657* (2013.01)

(58) Field of Classification Search
CPC ....... G06F 12/10–109; G06F 2212/657; G06F 9/30101; G06F 11/07–0796; G06F 11/362; G06F 12/1009; G06F 2212/1044
See application file for complete search history.

(56) References Cited

U.S. PATENT DOCUMENTS

| | | | |
|---|---|---|---|
| 10,482,012 B1* | 11/2019 | Gordon | G06F 12/0284 |
| 2013/0166834 A1* | 6/2013 | Mayhew | G06F 12/10 |
| | | | 711/105 |
| 2016/0019168 A1* | 1/2016 | Rychlik | G06F 3/067 |
| | | | 711/152 |

FOREIGN PATENT DOCUMENTS

WO WO-2013090594 A2 * 6/2013 ............ G06F 9/3004

* cited by examiner

*Primary Examiner* — Nicholas J Simonetti (57) ABSTRACT

For one or more stages of execution of a software application at a first processor, a remap vector of a second processor is reconfigured to represent a dynamic mapping of virtual address groups to physical address groups for that stage. Each bit position of the remap vector is configured to store a value indicating whether a corresponding virtual address group is actively mapped to a corresponding physical address group. Address translation operations issued during a stage of execution of the software application are selectively processed based on the configuration of the remap vector for that stage, with the particular value at the bit position of the remap vector associated with the corresponding virtual address group controlling whether processing of the address translation operation is continued to obtain a virtual-to-physical address translation sought by the address translation operation or processing of the address translation operation is ceased and a fault is issued.

20 Claims, 5 Drawing Sheets

DYNAMIC REMAPPING OF VIRTUAL ADDRESS RANGES USING REMAP VECTOR

BACKGROUND

Memory multi-mapping in a graphics processing unit (GPU) or other processor allows a single physical address to be mapped to different virtual addresses at different processing stages. In a conventional multi-mapping system, the mapping of a virtual address to a physical address, or demapping of a virtual address from a physical address, triggers page table updates and subsequent translation lookaside buffer (TLB) cache entry invalidations. These page table updates and TLB cache entry invalidations are relatively time-consuming and can unnecessarily inhibit efficient processing of the processor. Moreover, the possibility that a physical address may map to different virtual addresses at different stages often complicates software debugging efforts in multi-mapped memory systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In a conventional multi-mapped processing system, remapping a physical address range at a processor to a different virtual address range typically entails updating one or more page tables of the processor to reflect the new mapping and, consequently, invalidating the TLB entries of one or more TLBs or other address translation caches that represent the previous virtual address to physical address mappings. In the processing systems and techniques described herein, a processor employs a remap vector to facilitate dynamic remapping of virtual address groups without necessitating such page table updates and TLB entry validations. In at least one embodiment, the remap vector comprises a plurality of bit positions, each bit position representing a corresponding virtual address group of a plurality of virtual address groups, with each virtual address group representing one or more virtual address pages or ranges. A first value (e.g., a "1") stored at a bit position of the remap vector signals to the processor that the corresponding virtual address range is currently actively mapped to a physical address range (that is, the virtual address group is "activated" or "enabled"), whereas a second value (e.g., a "0") stored at the bit position signals to the processor that the corresponding virtual address group is not actively mapped to a physical address range (that is, the virtual address range is "deactivated" or "disabled").

For each address translation operation received for processing at an address translation cache hierarchy of the processor, a TLB cache or other address translation cache identifies a virtual address group based on the virtual address associated with the address translation operation, and accesses the value stored the bit position of the remap vector associated with that virtual address group. The address translation cache hierarchy then selectively issues a fault or further processes the address translation operation based on the accessed value. In particular, if the value is the first value, the address translation cache hierarchy determines that the identified virtual address range is currently active, and thus permits further processing of the address translation operation at the address translation cache hierarchy so as to obtain the virtual-to-physical address mapping or translation sought by the address translation operation. Conversely, if the value is the second value, the address translation cache hierarchy determines that the identified virtual address group is currently inactive, and thus issues a fault in association with the address translation operation. This fault is processed by the address translation cache hierarchy to generate an interrupt that causes the processing system to return a fault to the client or host of the software application. Thus, the processing system can dynamically activate/deactivate different virtual address ranges through configuration of the remap vector and thus bypass the need to refresh page table entries and flush TLB entries with each virtual address range activation or deactivation. Moreover, the fault or interrupt returned to the client or host of the software application signals that the software application attempted to access an invalid virtual address, such as through the generation of an entry in an error log by interrupt handler logic that handles the interrupt. This signaling facilitates debugging of the software application through, for example, analysis of the error log to identify instances in which two virtual address ranges are inadvertently active concurrently.

Figure 1:
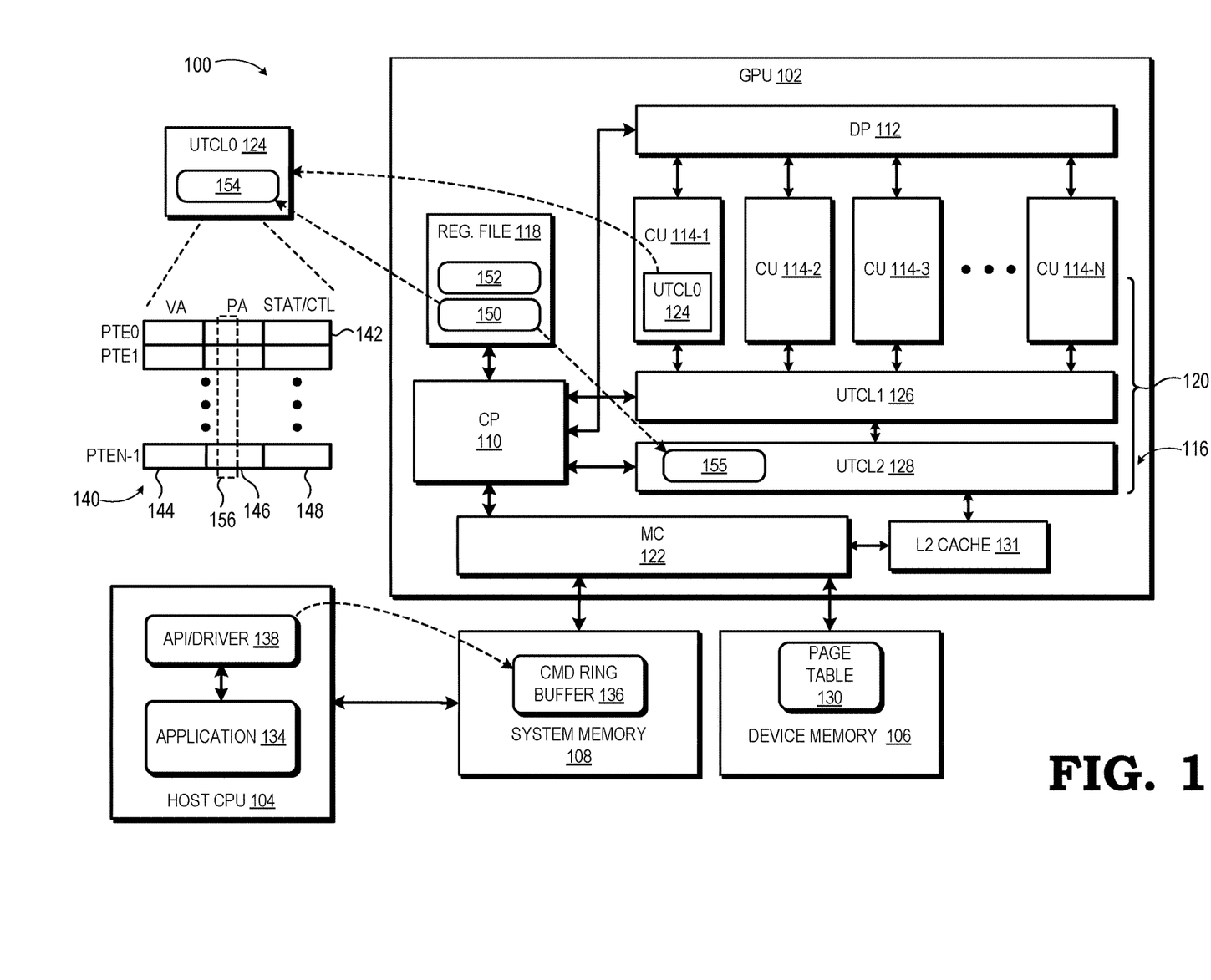
FIG. 1 is a block diagram of a processing system employing a dynamic memory mapping mode in accordance with some embodiments.

FIG. 1 illustrates a processing system 100 that employs a dynamic memory remapping mode in accordance with at least one embodiment. The processing system 100 includes a first processor 102, a second processor 104, a device memory 106 utilized by the first processor 102, and a system memory 108 shared by the first processor 102 and the second processor 104. For purposes of illustration, the processing system 100 is described in the example implementation whereby the first processor 102 includes a graphics processing unit (GPU) and the second processor 104 includes a host central processing unit (CPU), and thus processors 102, 104 are referred to herein as GPU 102 and host CPU 104, respectively. The memories 106, 108 include any of a variety of random access memories or combinations thereof, such as a double-data-rate dynamic random access memory (DDR DRAM), a graphics DDR DRAM (GDDR DRAM), and the like.

In the depicted embodiment, the GPU 102 includes a command processor (CP) 110, a dispatch processor (DP) 112, a plurality of compute units (CU) 114 (numbered 114-1, 114-2, 114-3, and 114-N), a memory management subsystem 116, and a register file 118. The memory management subsystem 116 includes an address translation cache hierarchy 120 and a memory controller 122 for managing address translation operations for one or both of the memories 106, 108. The memory management subsystem 116 has access to one or more page tables 130 stored in one or both of the memories 106, 108. The address translation cache hierarchy 120 includes one or more address translation caches (e.g., TLB caches) at one or more levels, and are referred to herein as "unified translation caches", or "UTCLX", where "LX" represents the corresponding caching level (e.g., Level 0 or "L0", Level 1 or "L1", etc.). For example, in at least one embodiment, the address translation cache hierarchy 120 includes the following address translation caches: one or more private UTCL0 124 at each CU 114, at least one shared UTCL1 126, and at least one shared UTCL2 128. Each of these address translation caches operates as a TLB cache at the corresponding level, and thus cache separate sets of copies of at least some of the in-use page table entries (PTEs) from the one or more page tables 130 to facilitate rapid access to the virtual-to-physical mappings represented by these PTEs without having to access them from memory each time.

As a general operational overview, the host CPU 104 executes a software application 134 that is represented as a one or more sets of executable instructions stored, for example, in the system memory 108 until accessed for execution. During the course of execution, the host CPU 104 may delegate a workload (e.g., the rendering of a display image) to the GPU 102 by sending one or more command packets representing the workload to a command ring buffer 136 implemented in the system memory 108 via a GPU driver and its associated application programming interface (API)(collectively referred to as API/driver 138) executed at the host CPU 104 (and likewise represented as one or more sets of executable instructions stored in the system memory 108 or elsewhere). The CP 110 of the GPU 102 accesses the one or more command packets from the command ring buffer 136 via the memory controller 122 and processes the one or more command packets. The CP 110 directs the DP 112 to initiate execution of the workload, in response to which the DP 112 directs the CUs 114 to execute one or more wavefronts for the workload in parallel.

Typically, at least some instructions in a wavefront utilize virtual addresses that refer to corresponding physical addresses for storage locations in device memory 106 or system memory 108 (e.g., a virtual address pointing to the physical address storing data representing primitives or textures during an image rendering workload), and thus execution of such instructions at a CU 114 triggers the CU 114 to initiate an address translation operation to obtain virtual-to-physical address mappings or translations for the virtual addresses from the memory management subsystem 116. The issuance of the address translation operation triggers the memory management subsystem 116 to probe each address translation cache level, starting with the UTCL0 124 local to the CU 114, until a valid copy of the sought-after VA-to-PA translation is obtained from one of the address translation caches of the address translation cache hierarchy 120, or if no valid copy of the address mapping is found in the address translation cache hierarchy 120, the memory controller 122 accesses page table 130 from memory to obtain the requested VA-to-PA translation.

In one embodiment, the system 100 employs a paged memory approach in which only a limited number of copies of pages of the device memory 106 are stored in the data caches (not shown) of the system 100, with each page representing a corresponding block of a certain size (e.g., 4K bytes) of the corresponding memory. As shown by view 140, to facilitate rapid translation of a virtual address associated with an address translation operation to its corresponding physical address, each address translation cache of the address translation cache hierarchy 120, such as the UTCL0 154, thus maintains a plurality of page table entries (PTEs) 142, with each PTE 142 corresponding to a page currently in use at the corresponding memory/caching level, and storing various information in a plurality of fields, such as virtual address (VA) field 144 storing at least a portion of a VA representing the corresponding page, a physical address (PA) field 146 storing at least a portion of a PA to which the virtual addresses of the corresponding page are mapped, as well as a status/control field 148 to store various status and control information for the page, such as read/write permissions, dirty status, etc.

In at least one embodiment, the GPU 102 employs memory multimapping such that multiple VA ranges within a client's address space may be mapped to the same PA range at different stages of execution. In a conventional implementation, such multimapping is implemented solely through management of the page tables and TLBs. The remapping of a PA range from the previous VA range to a new VA range in the conventional implementation thus necessitates updating the PTE of the page table associated with the PA range, as well as subsequently invalidating the TLB entry representing the previous VA-to-PA translation if such TLB entry currently is in the TLB.

In contrast, the processing system 100 employs a technique to dynamically remap VA ranges in a manner that does not require page table updates and TLB entry invalidations. This dynamic remapping technique is based on the logical organization of a set of M VA pages of a client address space into a set of N VA groups (M, N being integers greater than 1 and wherein M>=N) and implementing a client-programmable remap vector to identify which of the VA groups is actively mapped to a corresponding PA group (that is, "activated") and which of the VA groups is not actively mapped (that is, "deactivated"). In one embodiment, the remap vector (also referred to herein as "REMAP_VECTOR") is implemented as a value or set of bits at a register block (that is, a set of one or more registers) of the register file 118, with each bit position of the remap vector representing the current mapping status of a corresponding VA group such that a first bit value (e.g., "1") being stored at the bit position of the remap vector indicates that the VA pages of the corresponding VA group are active, that is, actively mapped to PA pages, while an opposite second bit value (e.g., "0") being stored at the bit position indicates the VA pages of the corresponding VA group are inactive, that is, not actively mapped to PA pages.

To illustrate, in one embodiment, the remap vector is implemented in a register block composed of eight 32-bit client-programmable registers for a total of 256 bit positions (REMAP_VECTOR[255:0]), with the least significant bit position (REMAP_VECTOR[0]) being set to "1" by default to ensure that at least one VA group is always identified as actively mapped when the remap mode is active, and thus allowing the remaining 255 bit positions (REMAP_VECTOR[255:1]) to represent the remap statuses of 255 VA groups. Each VA group represents a set of VA pages having the same bit sequence or bit value in a corresponding bit region 156 of the PA field 146 for the PTE 142 of the VA page. For example, as it takes eight bits to represent 255 possible values, the VA group to which a VA page belongs is identified by the value in an 8-bit region 156 of the PA field 146 of the PTE 142 of that VA page. Thus, if the 8-bit region 156 has a value of 10001011b, the corresponding VA page is a member of the VA group having a group ID of 139 and thus the map status for this VA page is the map status of the VA group at the remap vector bit position REMAP_VECTOR[139]. Similarly, if the 8-bit region 156 has a value of 00001010b, the VA group ID is 10 and the active/inactive mapping status for the VA page is represented at REMAP_VECTOR[10]. For ease of reference, this example 255 bit-position format for the REMAP_VECTOR is utilized herein, but it will be appreciated that fewer or more than 255 VA groups may be utilized. Further, in at least embodiment, the dynamic remap mode facilitated by the remap vector can be enabled or disabled through the configuration of a corresponding client-programmable register 152 (referred to herein as "REMAP_ENABLE") of the register file 118.

One or more address translation caches at one or more of the levels of the address translation cache hierarchy 120 include remap verification logic (see, e.g., 502 of FIG. 5) configured to determine the VA group of a address translation operation received or instantiated at that cache level and to access the bit value at the bit position of the remap vector corresponding to the identified VA group to determine whether the address translation operation is attempting to access an actively mapped virtual address. If the bit value has a first value (e.g., "1"), then the virtual address is identified as a currently actively mapped virtual address and thus the cache continues further processing of the address translation operation. Conversely, if the bit value has an opposite second value (e.g., "0"), then the virtual address is identified as a currently inactive virtual address, and in response to which the address translation cache issues a fault, which ultimately results in an interrupt that can be used for debugging of the software application 134, as described in greater detail below.

To facilitate this process, the caches employing this remap verification logic have access to the remap vector or a copy thereof. Accordingly, in some embodiments, the caches have direct access to the register block 150 storing the original remap vector. However, as this may introduce signaling delay as well as problems involving atomic access of the register block 150, in other embodiments each of the caches with the remap verification logic employs a local shadow register block to store a copy of the remap vector for ease of local access by the remap verification logic. To illustrate, each UTCL0 124 of the CUs 114 can include a shadow register block 154 to store a current shadow copy of the remap vector stored in the register block 150, and the UTCL2 128 can include a shadow register block 155 to store a current shadow copy of the remap vector as well. Thus, when the CP 110 stores an updated remap vector value supplied by the software application 134 as described below, the CP 110 or other component of the GPU 102 then updates all of the shadow register blocks of the appropriate caches of the address translation cache hierarchy 120 with the reconfigured/updated remap vector value.

Figure 2:
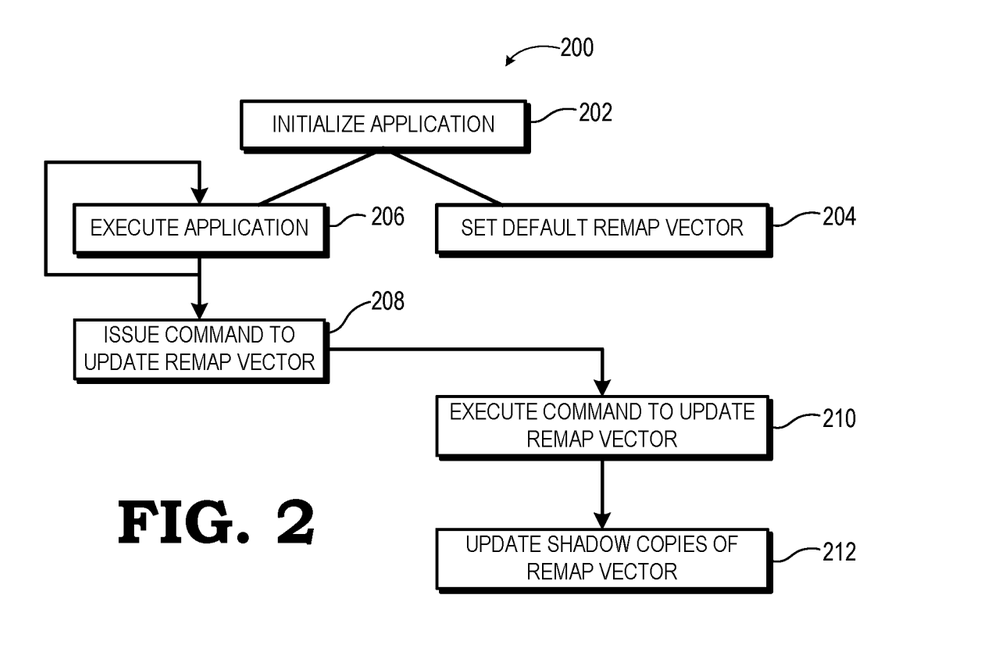
FIG. 2 is a flow diagram illustrating a method for dynamic memory remapping using the processing system of FIG. 1 in accordance with some embodiments.

FIG. 2 illustrates an example method 200 for dynamically reconfiguring the active VA mapping employed by the processing system 100 in accordance with some embodiments. The method 200 is described in the context of an example VA mapping reconfiguration operation 300 shown by FIG. 3. The method 200 initiates with the initialization of execution of the software application 134 (that is, the client) at block 202. This initialization includes the setting of a default remap vector for the client at block 204. Typically, the default remap vector will be set as REMAP_VECTOR [255:1]=0 to signal no active mappings of VA groups before execution. Similarly, the initialization would include setting REMAP_ENABLE=1 when the dynamic remapping mode is intended to be enabled for the client.

At block 206 the host CPU 104 executes the software application 134. As the software application 134 reaches different stages in a certain process, the software application 134 may be configured to change or reconfigure the VA-to-PA page mappings for the client memory address space, such as by deactivating certain VA pages and activating other VA pages for a given execution stage. Accordingly, when remapping events are to occur at a given stage, at block 208 the software application 134 issues a command to update the remap vector to reflect the revised VA-to-PA mapping. In one embodiment, the software application 134 issues this command by signaling the API/driver 138 to issue a remap configuration command 302 (FIG. 3) in the form of a SET_UCONFIG_REG packet that is inserted by the API/driver 138 into the command ring buffer 136. This WRITE DATA packet includes the updated value for REMAP_VECTOR[255:1] that reflects the updated VA-to-PA mapping. In one embodiment, the software application 134 is aware of the formatting of the remap vector and thus provides the updated value for REMAP_VECTOR[255:1] to the API/driver 138. In other embodiments, the software application 134 directly programs the registers of the register block 150 that represent the REMAP_VECTOR[255:1].

Figure 3:
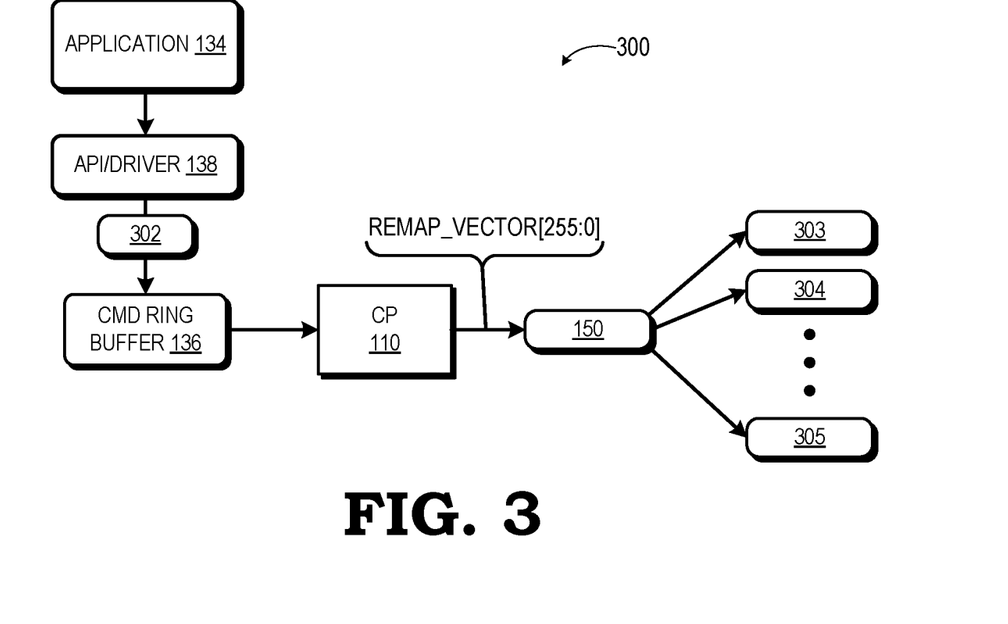
FIG. 3 is a diagram illustrating an example of the method of FIG. 2.

At block 210, the GPU 102 executes the command to update the remap vector by programming the updated value for REMAP_VECTOR[255:1] to the register block 150. To illustrate, when the command is provided in the form of the SET_UCONFIG_REG packet in the command ring buffer 136, when the CP 110 reaches the SET_UCONFIG_REG packet, the CP 110 executes the SET_UCONFIG_REG packet by storing the value in the data payload, that is, the updated value for REMAP_VECTOR[255:1] to the register block 150. At block 212, the GPU 102 updates the shadow copies of the remap vector stored in the shadow register blocks (represented by shadow register blocks 303, 304, 305) of the appropriate caches of the address translation cache hierarchy 120 with the updated remap vector value presently programmed to the register block 150. Further, in some embodiments, the API/driver 138 is configured to also issue a WAIT_REG_MEM packet into the command ring buffer 136 following insertion of the remap vector update command so as to poll the register block 150 to verify that the write to REMAP_VECTOR[255:1] has completed. The process represented by blocks 208, 210, and 212 is repeated at each stage of execution of the software application 134 for which the software application 134 is configured to dynamically activate and/or deactivate VA ranges for the following execution stage.

Figure 4:
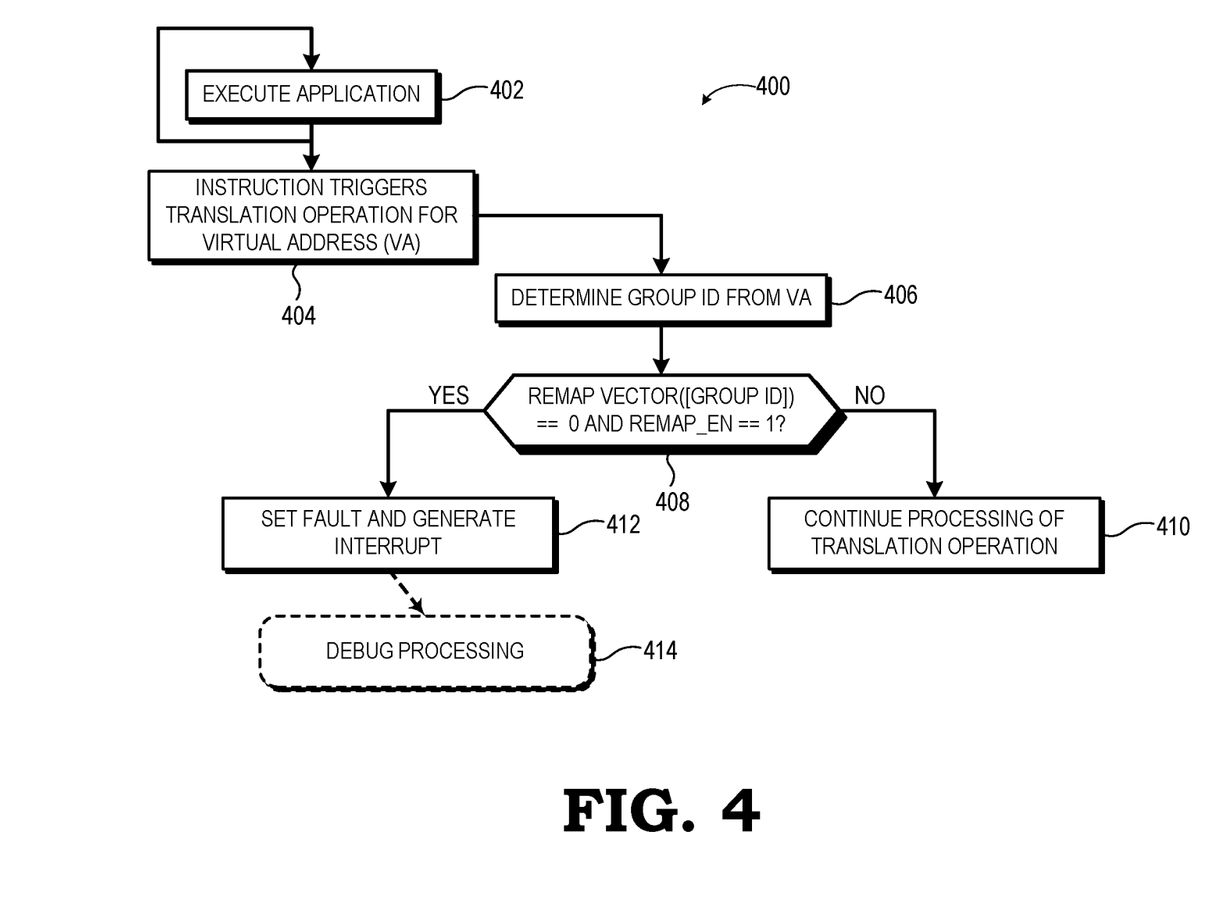
FIG. 4 is a flow diagram illustrating a method for processing an address translation operation associated with a virtual address group that has been dynamically activated or deactivated as part of a remap process in accordance with some embodiments.

FIG. 4 illustrates an example method 400 for processing address translation operations at the processing system 100 using the dynamic remap mode in accordance with some embodiments. At block 402, the software application 134 executes at the host CPU 104. As noted above, the software application 134 issues workloads to be executed at the GPU 102 as one or more wavefronts, at least some of which involve the execution of instructions that reference a virtual address that represents a corresponding physical address in one or both of the device memory 106 or the system memory 108. Accordingly, when such an instruction is executed and a virtual-to-physical address translation is needed to further execute the instruction, at block 404 an address translation operation identifying the required via a corresponding virtual address is triggered and issued to the address translation cache hierarchy 120.

With the issuance of the address translation operation to the address translation cache hierarchy 120, the remap-verification-enabled address translation cache receiving the address translation operation processes the address translation operation to verify the VA page referenced by the address translation operation is actively mapped. In one embodiment, the UTCL0s 124 include remap verification logic to perform this verification process, as does the UTCL2 128. Assume, for purposes of description, that the UTCL0 124 of the CU 114 that executed the instruction performs the remap verification process as it is the first to process the address translation operation in the address translation cache hierarchy 120. Accordingly, at block 406 remap verification logic 502 (FIGS. 5 and 6) of the UTCL0 124 determines the group ID for the VA page associated with the address translation operation from the 8-bit region 156 of the PA field 146 of the PTE 142 associated with the VA page. At block 408, the remap verification logic 502 then accesses the bit position of its shadow copy 504 (FIGS. 5 and 6) of the remap vector stored at the shadow register block 154 of the UTCL0 124 and determines whether the bit value at this bit position of the remap vector has the first value or the second value (that is, does REMAP_VECTOR[group ID] 0 or 1?) and further whether the dynamic remapping mode is enabled or disabled (that is, does REMAP_ENABLED==0 or 1?).

If the dynamic remapping mode is disabled (REMAP_ENABLED==0) or if the dynamic remapping mode is enabled and the bit value at the bit position for the VA group ID is 1 (that is, REMAP_VECTOR[group ID]==1), then the remap verification logic 502 identifies the VA of the address translation operation as belonging to a VA group that is currently actively mapped (or that the dynamic remapping mode is disabled). In response to this determination, at block 410 the remap verification logic 502 permits the address translation operation to continue processing as normal in the address translation cache hierarchy 120, and thus allowing probes to cascade through the address translation cache hierarchy 120 until a valid copy of the requested address mapping is found in one of the levels or, barring identification of a valid copy in an address mapping, the UTCL2 128 accesses a copy of the address mapping from one of the memories 106, 108 via a level 2 (L2) data cache 131 or other data cache of a data cache hierarchy (not shown), which in turn interfaces with the memory controller 122 to obtain this copy of the address mapping.

Conversely, if the dynamic remapping mode is enabled and the bit value at the bit position for the VA group ID is 0 (that is, REMAP_ENABLED==1 & REMAP_VECTOR [group ID]=0), then the remap verification logic 502 identifies the address translation operation as attempting to access a virtual address of a VA page that is a member of a VA group that is not currently actively mapped (that is, is currently inactive). In response to this determination, at block 412 the remap verification logic 502 triggers a fault that results in the address translation cache hierarchy 120 issuing an interrupt that signals this attempted access to an "invalid" VA page to the host CPU 104. For example, in one embodiment, in response to determining the address translation operation as attempting an access to a VA in an currently inactive VA group, the remap verification logic 502 issues a special miss (e.g., by asserting an "error_log" bit associated with the miss request), which is propagated through the levels of the address translation cache hierarchy 120 to the remap verification logic of the lowest level; in this case, the UTLC2 128. In response to this special miss, the remap verification logic of the UTLC2 128 generates an interrupt at the GPU 102, which in turn triggers an interrupt handler at one or both of the GPU 102 or the host CPU 104. To illustrate, with the error_log bit asserted, the UTCL2 128 identifies the special miss as an error log request, and thus generates an interrupt to enact the error logging. In instances where it is the remap verification logic of the UTCL2 128 itself that first detects an attempt to access a currently inactive VA group, at block 412 the UTCL2 128 returns a "no-retry" fault to the host CPU 104 and then generates an interrupt. In either event, interrupt handler processing the interrupt then generates an entry in the appropriate error log with the associated virtual address attempted noted in the entry. At block 414, this error log entry is used by a software debug tool to facilitate debugging of the software application 134, including identifying the attempted access to a virtual address associated with the currently inactive VA group as represented in the error log entry.

Figure 5:
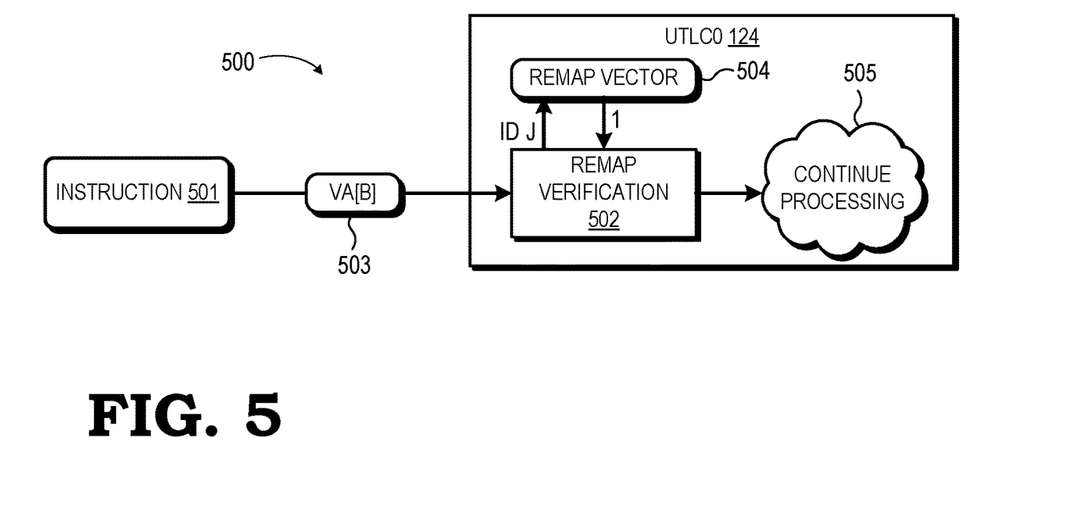
FIG. 5 is a diagram illustrating an example of the method of FIG. 4 in which the address translation operation is associated with an actively mapped virtual address group in accordance with some embodiments.
Figure 6:
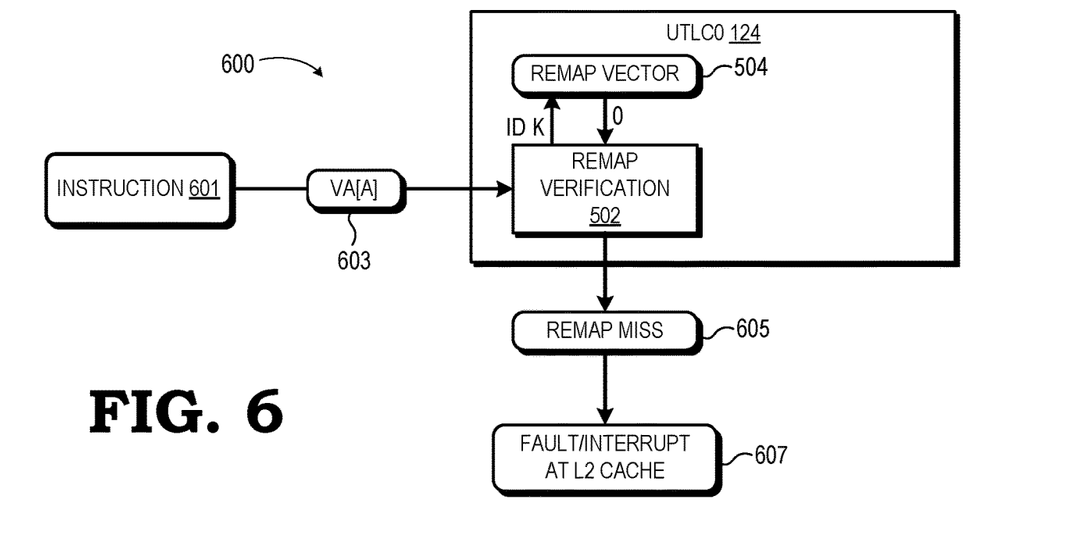
FIG. 6 is a diagram illustrating an example of the method of FIG. 4 in which the address translation operation is associated with an inactive virtual address group in accordance with some embodiments.

FIGS. 5 and 6 illustrate examples 500 and 600, respectively, of operations of the method 400 of FIG. 4. In the example 500, a CU 114 of the GPU 102 executes an instruction 501 that triggers issuance of an address translation operation 503 to access a VA-to-PA translation associated with virtual address VA[A] (block 404). In response to receiving the address translation operation 503, the remap verification logic 502 identifies the virtual address VA[A] as being part of the VA group having a group ID of J (block 406), and then accesses the bit value of the shadow copy 504 of the remap vector at bit position J (block 408), which in this example is the first value, or "1" (that is, REMAP_VECTOR[J]=1). In response, and as illustrated by illustrated element 505, the remap verification logic 502 permits normal processing of the address translation operation 503 to continue (block 410) so as to obtain the sought-after VA-to-PA translation.

In example 600 of FIG. 6, a CU 114 of the GPU 102 executes an instruction 601 that triggers issuance of a address translation operation 603 to access a VA-to-PA translation associated with virtual address VA[B] (block 404). In response to receiving the address translation operation 603, the remap verification logic 502 identifies the virtual address VA[B] as being part of the VA group having a group ID of K (block 406), and then accesses the bit value of the shadow copy 504 of the remap vector at bit position K (block 408), which in this example is the second value, or "0" (that is, REMAP_VECTOR[K]=0). In response, the remap verification logic 502 ceases any further normal processing of the address translation operation 503 and issues a remap miss 605, which is propagated to the L1 cache 126, which in turn forwards the remap miss 605 to the UTCL2 128, whereupon the UTCL2 128 triggers a fault and interrupt 607 (block 412) to initiate the process of creating an error log entry for the invalid attempt to access a currently inactive VA group.

Note that group ID J and K may be the same group ID, and thus be represented by the same position, with the difference between the example 500 and the example 600 being that the remap vector was updated between the two operations such that the value at the bit position was changed from a 1 to a 0, and thus resulting in the two different handlings of the two address translation operations as represented by FIGS. 5 and 6.

Figure 7:
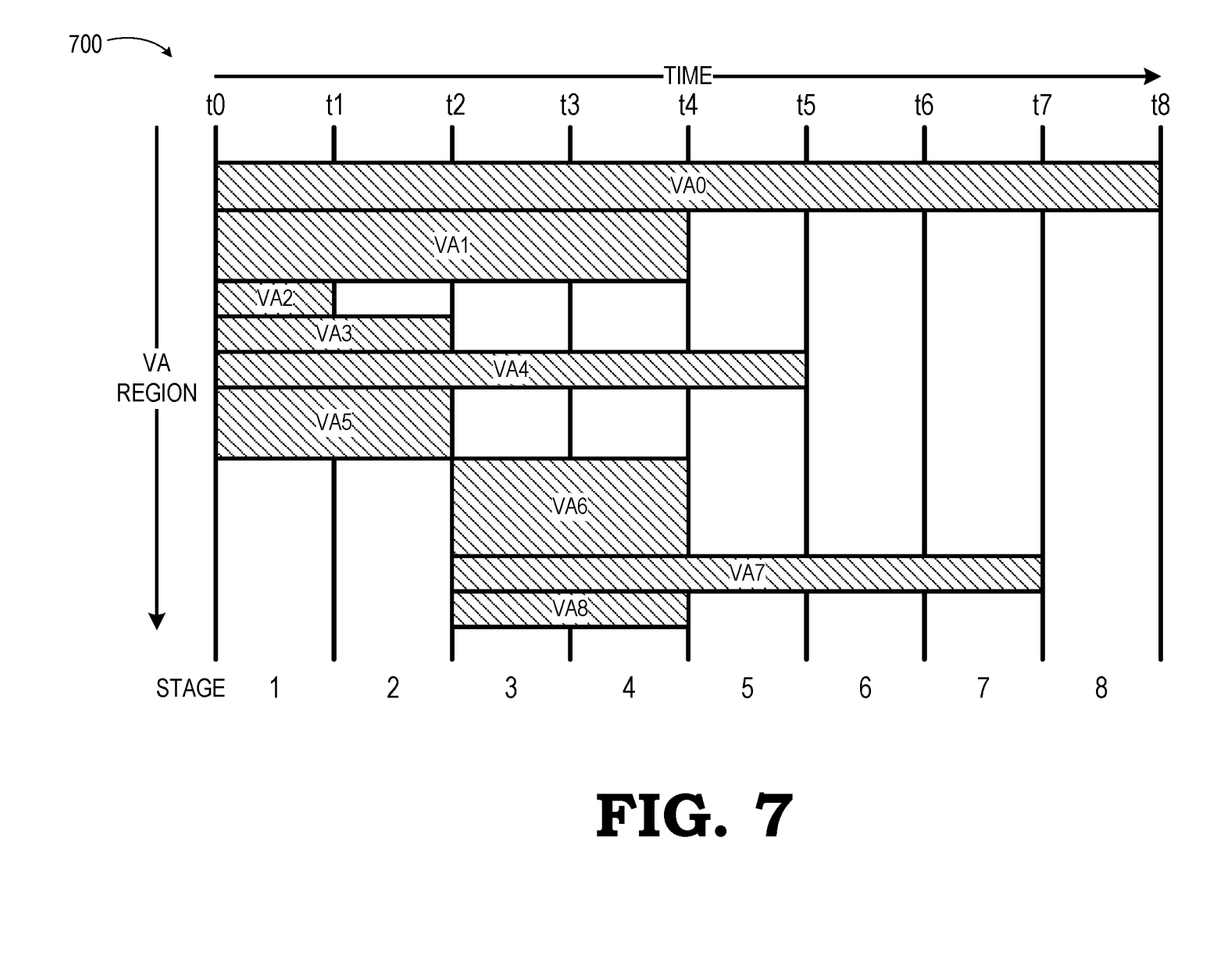
FIG. 7 is a diagram illustrating an example sequence for enabling and disabling different virtual address groups during stages of an executed process by reconfiguring a remap vector at each state in accordance with some embodiments.

FIG. 7 depicts a diagram 700 illustrating an example of the dynamic remapping process over a sequence of stages of execution of a workload executed at the processing system 100 in accordance with some embodiments. As depicted, the sequence of stages includes eight stages, numbered stage 1 through stage 8, along the horizontal axis. The workload includes nine VA groups (numbered VA0 through VA8) active at some point during these eight stages, with the VA groups being distributed along the vertical axis such that the vertical dimension of the region associated with a VA group in diagram 700 is proportional to the number of VA pages in that VA group. For example, as illustrated by diagram 700, during stage 1 the VA groups VA0, VA1, VA2, VA3, VA4, and VA5 are actively mapped, while VA groups VA6, VA7, and VA8 are not actively mapped, whereas during stage 5 only VA groups VA0 and VA7 are actively mapped, while VA groups VA1, VA2, VA3, VA4, VA5, VA6, and VA8 have been deactivated for stage 5.

At time t0, the software application 134 implements the following mapping configuration:
VA0=PA0→VA0 Group ID=0000_0000b, which indexes to REMAP_VECTOR[0]
VA1=PA1→VA1 Group ID=0000_0001b, which indexes to REMAP_VECTOR[1]
VA2=PA2→VA2 Group ID=0000_0010b, which indexes to REMAP_VECTOR[2]
VA3=PA3→VA3 Group ID=0000_0011b, which indexes to REMAP_VECTOR[3]
VA4=PA4→VA4 Group ID=0000_0100b, which indexes to REMAP_VECTOR[4]
VA5=PA5→VA5 Group ID=0000_0101b, which indexes to REMAP_VECTOR[5]
VA6=PA6→VA6 Group ID=0000_0110b, which indexes to REMAP_VECTOR[6]
VA7=PA7→VA7 Group ID=0000_0111b, which indexes to REMAP_VECTOR[7]
VA8=PA8→VA8 Group ID=0000_1000b, which indexes to REMAP_VECTOR[8]
As the memory space is shared, it should be noted that two or more of PA0, PA1, PA2, PA3, PA4, PA5, PA6, PA7, and PA8 may represent the same physical address range (so long as only one corresponding virtual address range is active for a given physical address at any given time). For example, PA1 and PA7 may represent the same physical address range so long as VA1 and VA7 are not active at the same time.

For this initial configuration, REMAP_VECTOR=XXXX_0000_0011_1111b. Accordingly, any attempt to access virtual addresses in VA6, VA7, or VA8 during stage 1 would trigger a fault and interrupt as described above.

At time t1, the software application 134 prepares for stage 2 by deactivating VA2. Thus, the software application 134 issues, via the API/driver 138, a command to reconfigure the remap vector as REMAP_VECTOR=XXXX_0000_0011_1011b. Accordingly, any attempt to access a virtual address in VA2, VA6, VA7, or VA8 during stage 2 would trigger a fault and interrupt.

At time t2, the software application 134 prepares for stage 3 by deactivating VA3 and VA5 and activating VA6, VA7, and VA8. Thus, the software application 134 issues, via the API/driver 138, a command to reconfigure the remap vector as REMAP_VECTOR=XXXX_0001_1101_0011b. Accordingly, any attempt to access a virtual address in VA2, VA3, or VA5 during stage 3 would trigger a fault and interrupt.

At time t3, no VA remappings are needed for stage 4, and thus the software application 134 prepares for stage 4 by maintaining the same remap vector as with stage 3. Accordingly, any attempt to access a virtual address in VA2, VA3, or VA5 during stage 4 would trigger a fault and interrupt.

At time t4, the software application 134 prepares for stage 5 by deactivating VA1, VA6, and VA8. Thus, the software application 134 issues, via the API/driver 138, a command to reconfigure the remap vector as REMAP_VECTOR=XXXX_0000_1001_0001b. Accordingly, any attempt to access a virtual address in VA1, VA2, VA3, VA5, VA6, or VA8 during stage 5 would trigger a fault and interrupt.

At time t5, the software application 134 prepares for stage 6 by deactivating VA5. Thus, the software application 134 issues, via the API/driver 138, a command to reconfigure the remap vector as REMAP_VECTOR=XXXX_0000_1000_0001b. Accordingly, any attempt to access a virtual address in VA1, VA2, VA3, VA4, VA5, VA6, or VA8 during stage 6 would trigger a fault and interrupt. Stage 7 uses the same mapping, and thus the same remap vector is maintained for stage 7.

At time t7, the software application 134 prepares for stage 8 by deactivating VA8. Thus, the software application 134 issues, via the API/driver 138, a command to reconfigure the remap vector as REMAP_VECTOR=XXXX_0000_0000_0001b. Accordingly, with only VA0 active for stage 8, any attempt to access a virtual address in VA1, VA2, VA3, VA4, VA5, VA6, VA7, or VA8 during stage 8 would trigger a fault and interrupt. At time t8, the software application 134 terminates execution of this workload, and thus resets the mappings of all VA groups to inactive by reconfiguring the remap vector to REMAP_VECTOR=XXXX_0000_0000b.

In some embodiments, the apparatus and techniques described above are implemented in a system including one or more integrated circuit (IC) devices (also referred to as integrated circuit packages or microchips), such as the GPU 102 described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    configuring a remap vector at a first processor at a first time, each bit position of the remap vector storing a value indicating whether a corresponding virtual address group of a plurality of virtual address groups is actively mapped to a corresponding physical address group, each virtual address group of the plurality of virtual address groups corresponding to a single bit position of the remap vector;
    detecting, at the first processor, a first address translation operation directed to a first virtual address group of the plurality of virtual address groups following the first time; and
    selectively issuing a fault at the first processor or further processing the first address translation operation at an address translation cache hierarchy of the first processor based on a value stored at a first bit position of the remap vector that corresponds to the first virtual address group.

2. The method of claim 1, wherein configuring the remap vector comprises one of:
    setting the first bit position to a first value to indicate that the first virtual address group is actively mapped to a corresponding physical address group; and
    setting the first bit position to a second value to indicate that the first virtual address group is not actively mapped to a corresponding physical address group.

3. The method of claim 2, wherein selectively issuing a fault or further processing the first address translation operation comprises:
    further processing the first address translation operation at the address translation cache hierarchy responsive to the first bit position storing the first value; and
    issuing a fault at the first processor responsive to the first bit position storing the second value.

4. The method of claim 3, further comprising:
    generating, at the first processor, an interrupt responsive to the issued fault.

5. The method of claim 4, further comprising:
    debugging a software application executing at the first processor based on an error log entry generated in association with the interrupt.

6. The method of claim 1, wherein:
    configuring the remap vector is based on a command received from a second processor responsive to execution of a software application at the second processor, the command including a value to be stored at the remap vector;
    the first processor comprises a graphics processing unit; and
    the second processor comprises a central processing unit.

7. The method of claim 1, further comprising:
    identifying the first virtual address group based on a subset of bits of a physical address group mapped to a virtual address of the first address translation operation; and
    identifying, at the first processor, the first bit position of the remap vector based on the first virtual address group.

8. The method of claim 1, further comprising:
    reconfiguring the remap vector at the first processor at second time;
    detecting, at the first processor, a second address translation operation directed to a second virtual address group of the plurality of virtual address groups following the second time; and
    selectively issuing a fault at the first processor or further processing the second address translation operation at the address translation cache hierarchy based on the value of the remap vector at a second bit position that corresponds to the second virtual address group.

9. The method of claim 8, wherein:
the second virtual address group is the first virtual address group;
the second bit position is the first bit position;
configuring the remap vector at the first time comprises setting the first bit position to a first value;
selectively issuing a fault at the first processor or further processing the first address translation operation comprises further processing the first address translation operation at the address translation cache hierarchy responsive to the first bit position having the first value;
reconfiguring the remap vector at the second time comprises setting the first bit position to a second value; and
selectively issuing a fault at the first processor or further processing the second address translation operation comprises issuing a fault at the first processor responsive to the first bit position having the second value.

10. A system comprising:
a first processor comprising:
a register block configured to store a remap vector, wherein each bit position of the remap vector is configured to store a value indicating whether a corresponding virtual address group of a plurality of virtual address groups is actively mapped to a corresponding physical address group, wherein each virtual address group of the plurality of virtual address groups corresponds to a single bit position of the remap vector; and
an address translation cache hierarchy coupled to the register block and comprising a first address translation cache, the first address translation cache configured to selectively issue a fault or further process a first address translation operation based on the value of the remap vector at a first bit position that corresponds to a first virtual address group that includes a virtual address of the first address translation operation.

11. The system of claim 10, wherein the first processor is configured to configure the remap vector by:
when the first virtual address group is actively mapped to a corresponding physical group, setting the first bit position to a first value; and
when the first virtual address group is not actively mapped to a corresponding physical group, setting the first bit position to a second value.

12. The system of claim 11, wherein the first address translation cache is configured to selectively issue a fault or further process the first address translation operation by:
further processing the first address translation operation at the first address translation cache responsive to the first bit position storing the first value; and
issuing a fault at the first address translation cache responsive to the first bit position storing the second value.

13. The system of claim 12, further comprising:
a second address translation cache of the address translation cache hierarchy, wherein the second address translation cache is configured to generate an interrupt responsive to the issued fault.

14. The system of claim 13, wherein an interrupt handler generates an error log entry associated with the interrupt, the error log entry identifying the virtual address.

15. The system of claim 10, further comprising:
a second processor coupled to the first processor, wherein the second processor is configured to issue a command to the first processor responsive to execution of a software application at the second processor, the command including a value to be stored at the remap vector; and
wherein:
the first processor is configured to configure the remap vector responsive to the command and based on the value;
the first processor comprises a graphics processing unit; and
the second processor comprises a central processing unit.

16. The system of claim 10, wherein the first address translation cache is further configured to:
identify the first virtual address group based on a subset of bits of a physical address group mapped to a virtual address of the first address translation operation; and
identify the first bit position of the remap vector based on the first virtual address group.

17. A method comprising:
for each stage of a plurality of stages of execution of a software application executed at a first processor, reconfiguring a remap vector of a second processor to represent a dynamic mapping of virtual address groups to physical address groups for that stage, each bit position of the remap vector being configured to store a value indicating whether a corresponding virtual address group is actively mapped to a corresponding physical address group, and each virtual address group of the virtual address groups corresponding to a single bit position of the remap vector; and
selectively processing address translation operations issued during a stage of execution of the software application based on a configuration of the remap vector for that stage.

18. The method of claim 17, wherein selectively processing address translation operations issued during the stage of execution comprises:
determining, for an address translation operation, a virtual address group associated with a virtual address of the address translation operation;
determining a value stored at a bit position of the remap vector that is associated with the determined virtual address group;
responsive to the value being a first value, continuing processing of the address translation operation at an address translation cache hierarchy of the second processor to obtain data sought by the address translation operation; and
responsive to the value being a second value, ceasing processing of the address translation operation and issuing a fault at the address translation cache hierarchy.

19. The method of claim 18, further comprising:
generating an interrupt at the second processor responsive to the issued fault.

20. The method of claim 19, further comprising:
generating an error log entry associated with the interrupt, the error log entry identifying the virtual address of the address translation operation.

* * * * *